(12) United States Patent
Jandal et al.

(10) Patent No.: US 10,190,808 B2
(45) Date of Patent: Jan. 29, 2019

(54) REFRIGERATION SYSTEM WITH PURGE AND ACID FILTER

(71) Applicant: TRANE INTERNATIONAL INC., Piscataway, NJ (US)

(72) Inventors: Daoud Ali Jandal, LaCrosse, WI (US); Julie Ann Majurin, LaCrosse, WI (US); Stephen Anthony Kujak, Onalaska, WI (US); Raymond Scott Schafer, Holmen, WI (US); Paul Edmond Cieslinski, LaCrosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 552 days.

(21) Appl. No.: 13/842,083

(22) Filed: Mar. 15, 2013

(65) Prior Publication Data

US 2013/0283830 A1 Oct. 31, 2013

Related U.S. Application Data

(60) Provisional application No. 61/640,193, filed on Apr. 30, 2012.

(51) Int. Cl.
*F25B 43/00* (2006.01)
*F25B 1/00* (2006.01)
(Continued)

(52) U.S. Cl.
CPC .......... *F25B 43/003* (2013.01); *B01D 53/007* (2013.01); *B23P 15/26* (2013.01);
(Continued)

(58) Field of Classification Search
CPC ................... B01D 2253/1122; B01D 2257/204–2257/2047; B01D 53/007;
(Continued)

(56) References Cited

U.S. PATENT DOCUMENTS 3,633,377 A 1/1972 Quick
4,304,102 A 12/1981 Gray
(Continued)

FOREIGN PATENT DOCUMENTS

CN 1203350 12/1998
CN 1871481 11/2006
(Continued)

OTHER PUBLICATIONS

International Search Report for PCT/US2013/038404 dated Jul. 29, 2013, 3 pages.
(Continued)

*Primary Examiner* — Emmanuel Duke
(74) *Attorney, Agent, or Firm* — Hamre, Schumann, Mueller & Larson, P.C.

(57) ABSTRACT

Refrigeration systems with a purge for removing non-condensables from the refrigerant and an acid filter for remove acid from the refrigerant are provided. The acid filter can be operatively connected to the purge. Optionally, the purge can include a separating device for separating non-condensable gases from condensable refrigerant gases and an acid filter is provided to remove acid from the condensable refrigerant gases.

9 Claims, 3 Drawing Sheets

(51) Int. Cl.
*B23P 15/26* (2006.01)
*F25B 43/04* (2006.01)
*B01D 53/00* (2006.01)

(52) U.S. Cl.
CPC .............. *F25B 1/00* (2013.01); *F25B 43/043* (2013.01); *B01D 2253/1122* (2013.01); *B01D 2257/2045* (2013.01); *B01D 2257/2047* (2013.01); *B01D 2257/80* (2013.01); *Y10T 29/49359* (2015.01)

(58) Field of Classification Search
CPC ........ B01D 2257/80; B01D 2257/2045; F25B 43/003; F25B 43/043; F25B 1/053; F25B 1/00; F25B 31/002; F25B 45/00; B23P 15/26; Y10T 29/49359
See application file for complete search history.

(56) References Cited

U.S. PATENT DOCUMENTS

| | | | |
|---|---|---|---|
| 4,476,668 A | 10/1984 | Reilly | |
| 4,476,688 A * | 10/1984 | Goddard | F25B 45/00 62/149 |
| 4,478,050 A | 10/1984 | DiCarlo et al. | |
| 4,506,523 A | 3/1985 | DiCarlo et al. | |
| 4,809,515 A | 3/1989 | Houwink | |
| 4,939,903 A * | 7/1990 | Goddard | F25B 45/00 62/149 |
| 4,982,578 A | 1/1991 | Heffner et al. | |
| 5,022,230 A | 6/1991 | Todack | |
| 5,031,410 A * | 7/1991 | Plzak | F25B 43/043 62/475 |
| 5,094,087 A | 3/1992 | Gramkow | |
| 5,097,667 A | 3/1992 | Gramkow | |
| 5,195,333 A | 3/1993 | Van Steenburgh, Jr. | |
| 5,203,177 A * | 4/1993 | Manz | F25B 45/00 62/149 |
| 5,289,693 A | 3/1994 | Major et al. | |
| 5,327,735 A | 7/1994 | Hatton | |
| 5,359,859 A | 11/1994 | Bench et al. | |
| 5,433,081 A | 7/1995 | Major et al. | |
| 5,471,848 A | 12/1995 | Major et al. | |
| 5,533,358 A | 7/1996 | Crandall et al. | |
| 5,570,590 A | 11/1996 | Hansen et al. | |
| 5,575,833 A | 11/1996 | Griffin | |
| 5,685,161 A | 11/1997 | Peckjian et al. | |
| 5,709,091 A | 1/1998 | Todack | |
| 5,770,048 A * | 6/1998 | Scaringe | F25B 47/003 208/180 |
| 5,806,322 A | 9/1998 | Cakmakci et al. | |
| 6,564,564 B2 | 5/2003 | Heiden et al. | |
| 6,952,938 B2 | 10/2005 | Albertson | |
| 2003/0074909 A1* | 4/2003 | Heiden | F25B 43/043 62/195 |

FOREIGN PATENT DOCUMENTS

| | | | |
|---|---|---|---|
| CN | 201688633 | 12/2010 | |
| GB | 296498 | * 9/1928 | ............ F25B 43/003 |

OTHER PUBLICATIONS

Written Opinion for PCT/US2013/038404 dated Jul. 29, 2013, 7 pages.
Extended European Search Report, dated Feb. 1, 2016; European Patent Application No. 13785172.1 (7 pages).

* cited by examiner

REFRIGERATION SYSTEM WITH PURGE AND ACID FILTER

The embodiments disclosed herein relate generally to a refrigeration system. More particularly, the embodiments relate to a refrigeration system with a purge.

BACKGROUND

Refrigeration systems such as centrifugal chillers, utilize low pressure refrigerants such as CFC-11, CFC-113, HCFC-123 and multi-pressure refrigerants such as CFC-114 and HFC-245fa to operate at, e.g., less than atmospheric pressure, either at all times or under a set of operating or stand-down conditions. Since the chillers are operating at subatmospheric pressures, air and moisture may leak into the machine through these low pressure areas. Once the air and moisture and other non-condensables enter the chiller, the non-condensables accumulate in the condenser portion of the chiller during machine operation. The non-condensable gases in the condenser reduce the ability of the condenser to condense refrigerant, which in turn results in an increased condenser pressure, and thereby results in lower chiller efficiency and capacity.

SUMMARY

The embodiments described herein are directed to refrigeration systems with a purge and an acid filter and methods for servicing an acid filter connected to a purge in a refrigeration system.

Purges have been used to expel non-condensables such as, for example, moisture, air and other non-condensables, from refrigerant chillers while minimizing the loss of chiller refrigerant in the process of removing such non-condensables and which can be operative independent of the operational status of the chiller with which it is used. Improvements may be made to purges used in refrigeration systems.

In one embodiment, a refrigeration system includes a compressor, a condenser, an expansion device, and an evaporator. The compressor, the condenser, the expansion device, and the evaporator are fluidly connected to form a refrigeration circuit. A purge is fluidly connected to the condenser to receive a chiller refrigerant flowing through the refrigeration system from the condenser. The purge is configured to remove one or more non-condensable gases from the chiller refrigerant. An acid filter is operatively connected to the purge and configured to remove one or more acids from the chiller refrigerant.

In one embodiment, a system for removing undesired materials from a chiller refrigerant of a refrigeration system includes a purge including an inlet to receive the chiller refrigerant from a condenser of the refrigeration system. The purge is configured to remove one or more non-condensable gases from the chiller refrigerant. The purge further includes an outlet to return the chiller refrigerant to the refrigeration system. An acid filter is fluidly connected to the purge and configured to remove one or more acids from the refrigerant.

In one embodiment, a method of removing undesired materials from a chiller refrigerant of a refrigeration system includes receiving the chiller refrigerant from a condenser of the refrigeration system, removing one or more non-condensable gases from the chiller refrigerant, and removing one or more acids from the chiller refrigerant.

In one embodiment, a method of servicing an acid filter of a refrigeration system, includes disconnecting the acid filter from a location with a purge of the refrigeration system, removing the acid filter from the location so as to make room for a new acid filer, placing the new acid filter in the location within the refrigeration system, and operatively connecting the new acid filter to the purge.

BRIEF DESCRIPTION OF THE DRAWINGS

Referring now to the drawings in which like reference numbers represent corresponding parts throughout.

DETAILED DESCRIPTION

The embodiments described herein are directed to a refrigeration system with a purge and an acid filter.

Figure 1:
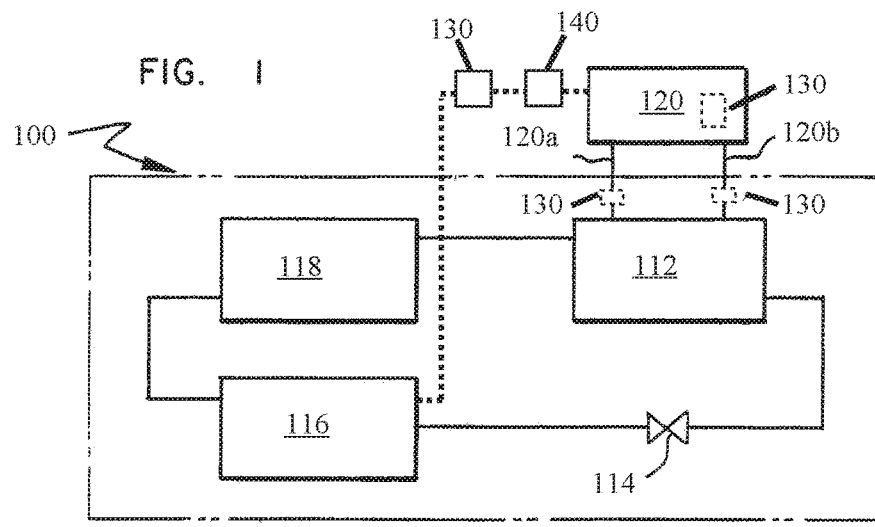
FIG. 1 illustrates a block diagram of an embodiment of a refrigeration system with a purge and an acid filter.

FIG. 1 illustrates a block diagram of a refrigeration system 100 with a purge 120 and one or more acid filters 130. The refrigeration system 100 can be a chiller that provides chilled water for use in industrial processes or in the comfort conditioning of building structures. As shown in FIG. 1, the chiller 100 is a centrifugal chiller that includes a condenser 112, an expansion device 114, an evaporator 116 and a compressor 118. The condenser 112, the expansion device 114, the evaporator 116 and the compressor 118 can be serially connected to form a hermetically sealed closed-loop chiller refrigeration circuit which employs a low pressure refrigerant. The low pressure refrigerant can include, for example, the refrigerants referred to as R123, R245fa, etc. The use of a low pressure refrigerant, at certain times and under certain operating conditions, may result in portions of refrigeration system 100 being operated at less than atmospheric pressure.

Because certain components, including the evaporator 116 and, under certain conditions, the condenser 112 of the chiller 100, operate at a pressure lower than the atmospheric pressure, it is possible for air, moisture and other non-condensables to leak into the chiller. The non-condensables can include, for example, air, water and other non-condensables, make their way to and become trapped in the condenser 112 with the result that the condensing pressure and compressor power requirements increase thereby reducing chiller efficiency and cooling capacity. It will be appreciated that the chiller 100 can also utilize medium or high pressure refrigerants, and operate at or above the atmospheric pressure.

In order to remove the non-condensables, a purge 120 is employed with the chiller 100. The purge 120 can be connected in a free-flow circulatory relationship with the condenser 112 of the chiller 100 by supply and return lines 120a and 120b, both of which open into a vapor space within the condenser 112.

The refrigeration system 100 further includes one or more acid filters 130 for removing acid from the refrigerant. Acid(s) can be produced as a result of refrigerant degradation or lubricant degradation/circulation, or could be introduced from process chemicals or other system components. As shown in FIG. 1, the acid filter 130 is operatively connected to the purge 120. The filter 130 can be inside the purge 120. Optionally, the filter 130 can also be located outside the purge 120. The acid filter 130 can be a component of the purge 120. Optionally, the acid filter 130 can be embedded into one or more components of the purge 120. Optionally, the acid filter 130 can be a separate unit.

The acid filter 130 can be a replaceable unit that is convenient for servicing. For example, the acid filter 130 can be removed from the purge 120 or the refrigeration system 100 and be disposable in an environmentally friendly manner. A new acid filter can be inserted into the purge 120 or the refrigeration system 100 to replace the old one.

As shown in FIG. 1, the acid filter 130 can be located at the supply line 120*a* for removing acid from the refrigerant drawn from the condenser 112. The acid filter 130 can be located at the return line 120*b* for removing acid from the refrigerant directed back to the condenser 112.

As shown in FIG. 1, a separation device 140 can be optionally included and connected to the purge 120 for separating non-condensable gases from condensable gases, and the acid filter 130 is operatively connected to the separation device 140 and the evaporator 116. It will be appreciated that the separation device 140 can be included in the purge 120.

The acid filter 130 includes one or more acid-removing materials to remove acid from the refrigerator from the condenser 112. The acid to be removed includes, for example, inorganic acids such as hydrofluoric acid and hydrochloric acid, and/or organic acids such as carboxylic acids from lubricants or other sources. In one embodiment, the acid filter 130 includes a sacrificial material, for example, aluminum metal, zinc metal, and/or other reactive metals or reactive materials, which reacts with the acid and is disposable after an accumulation of the reaction product. In another embodiment, the acid filter 130 includes an acid-removing material such as, for example, ionic salts that can react with the acids to form benign products.

Figure 2:
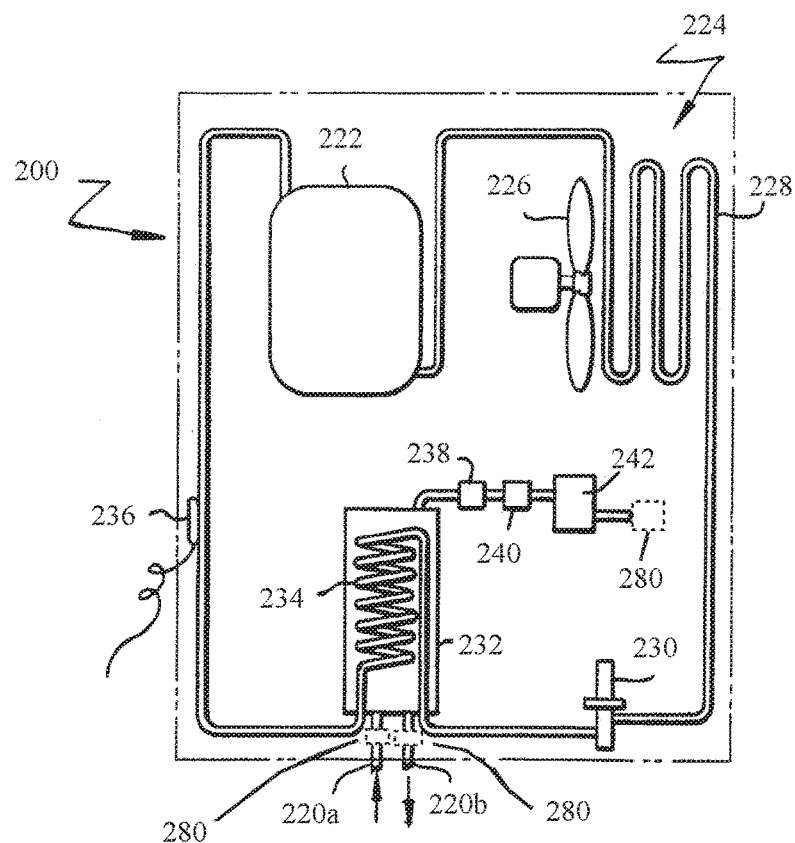
FIG. 2 illustrates a schematic diagram of an embodiment of a purge with an acid filter.

FIG. 2 illustrates a schematic diagram of a purge 200 with one or more acid filters 280. The purge 200 can remove non-condensables from the refrigerant of a refrigeration system, such as the refrigeration system 100. The acid filter 280 can remove acid from the refrigerant.

The purge 200 can include an entirely separate and discrete hermetic refrigeration circuit which may employ a purge refrigerant different than the chiller system refrigerant. For example, the refrigerant used in the purge 200 can be a relatively high pressure refrigerant such as, for example, the refrigerant referred to as R-12, R-134a, R-410A, R-407A, R-407F, R-404, etc. It will be appreciated that the refrigerant used in the purge 200 can be any suitable refrigerant that can create a lower evaporative temperature than the chiller refrigerant.

The purge 200 is connected in a free-flow circulatory relationship with a condenser, such as the condenser 112, of a refrigeration system, such as the chiller 100, by supply and return lines 220*a* and 220*b*, both of which open into a vapor space within a chiller condenser of the refrigeration system. Chiller refrigerant vapor can be drawn from the vapor space within the chiller condenser into the purge 200 through the supply line 220*a*. The chiller refrigerant entering the purge 200 undergoes a heat exchange relationship with the purge refrigerant through the return line 220*b*. The condensed chiller refrigerant overflows into and is directed back to the chiller condenser.

The purge 200 includes a refrigerant compressor 222 which is a component of a condensing unit 224. The condensing unit 224 also includes a fan 226 and a heat exchanger coil 228 to which compressor 222 discharges hot compressed purge refrigerant gas when the purge 200 is in operation.

The fan 226, when operating, causes ambient air to move through the coil 228 in a heat exchange relationship with the purge system refrigerant passing from the compressor 222 to and through the condenser coil 228. It will be appreciated that while the purge 200 may use an air-cooled purge condensing unit, as it avoids the need to "hook-up" to a different cooling source such as water, the condensing unit 224 could be cooled by an alternate cooling source.

The condensed purge refrigerant next leaves the coil 228 and passes to and through an expansion device 230. The expansion device 230, which functions as a suction pressure regulator, reduces the temperature of the purge refrigerant to, for example, approximately 0° F. and maintains it there by regulating the pressure of the purge refrigerant to a target pressure.

The refrigerant next enters a purge cooling coil 234 within a purge tank 232 through a purge coil inlet. The purge cooling coil 234 functions as an evaporator in the purge refrigeration circuit, by placing the relatively cold purge system refrigerant flowing therethrough into a heat exchange relationship with the relatively warm chiller system refrigerant vapor which is drawn into the purge tank 232. By the condensing of the chiller system refrigerant on the purge cooling coil 234, the removal of non-condensables from the chiller system refrigerant is accomplished internal of the purge tank 232.

After passing through the cooling coil 234 and being vaporized in a heat exchange-relationship with the chiller refrigerant in the purge tank 232, the purge refrigerant flows out of the purge tank 232 through a purge coil outlet and back to the compressor 222. The temperature of the refrigerant gas passing from the coil 234 back to compressor 222 can be sensed by a control switch 236 and can be used in controlling the operation of the purge 200 and the removal of non-condensable elements such as air from the purge tank 232. The condensed chiller refrigerant is directed back from the purge tank 232 to the chiller condenser. The concept of the above process is further described in U.S. Pat. Nos. 6,564,564 and 5,031,410, the contents of each are incorporated herein by reference.

FIG. 2 also illustrates components of a pump-out portion of the purge 200. The pump-out portion functions to remove non-condensable elements such as air and acid from the purge tank 232 and can include a solenoid valve 238, a flow restrictor 240, such as a porous metal plug or capillary tube, a pump-out compressor 242, and optionally an acid filter 280. When the temperature of the purge system refrigerant returning to compressor 222 from the purge coil 234 drops to a predetermined level, such as for example approximately 20° F. as sensed by the temperature control switch 236, a signal is generated by the temperature control switch 236 which is used to energize the solenoid 238 and the pump-out compressor 242 which causes the evacuation of air from the purge tank 234 through a pump-out process.

The acid filter 280 can be inside the purge 200. Optionally, the filter 280 can be located outside the purge 200. The acid filter 280 can be a component of the purge 200. Optionally, the acid filter 280 can be embedded into one or more components of the purge 200. Optionally, the acid filter 280 can be a separate unit.

In one embodiment, when the acid filter 280 is connected to the pump-out portion, the non-condensables and condensable gases still flowing with the non-condensable refrigerant gases are directed from the purge tank 232 through the acid filter 280, where acid included in the gases is removed by the acid filter 280. The filtered condensable refrigerant can be returned to an evaporator, such as the evaporator 116, of the refrigeration system.

As shown in FIG. 2, the acid filter 280 can be located at the supply line 220*a* to remove acid from the chiller system refrigerant vapor which is drawn into the purge 200 from the vapor space in the chiller condenser. The acid filter 280 can also be located at the return line 220*b* to remove acid from the condensed chiller refrigerant directed back from the purge tank 232 to the chiller condenser. The supply line 220*a* and/or the return line 220*b* can be engineered to include the acid filter 280. In one embodiment, the diameters of the supply line 220*a* and/or the return line 220*b* can be increased to minimize the pressure drop through the acid filter 280.

It will be appreciated that the acid filter 280 can be disposed at other locations to remove acid from the refrigerant of the refrigeration system.

Figure 3:
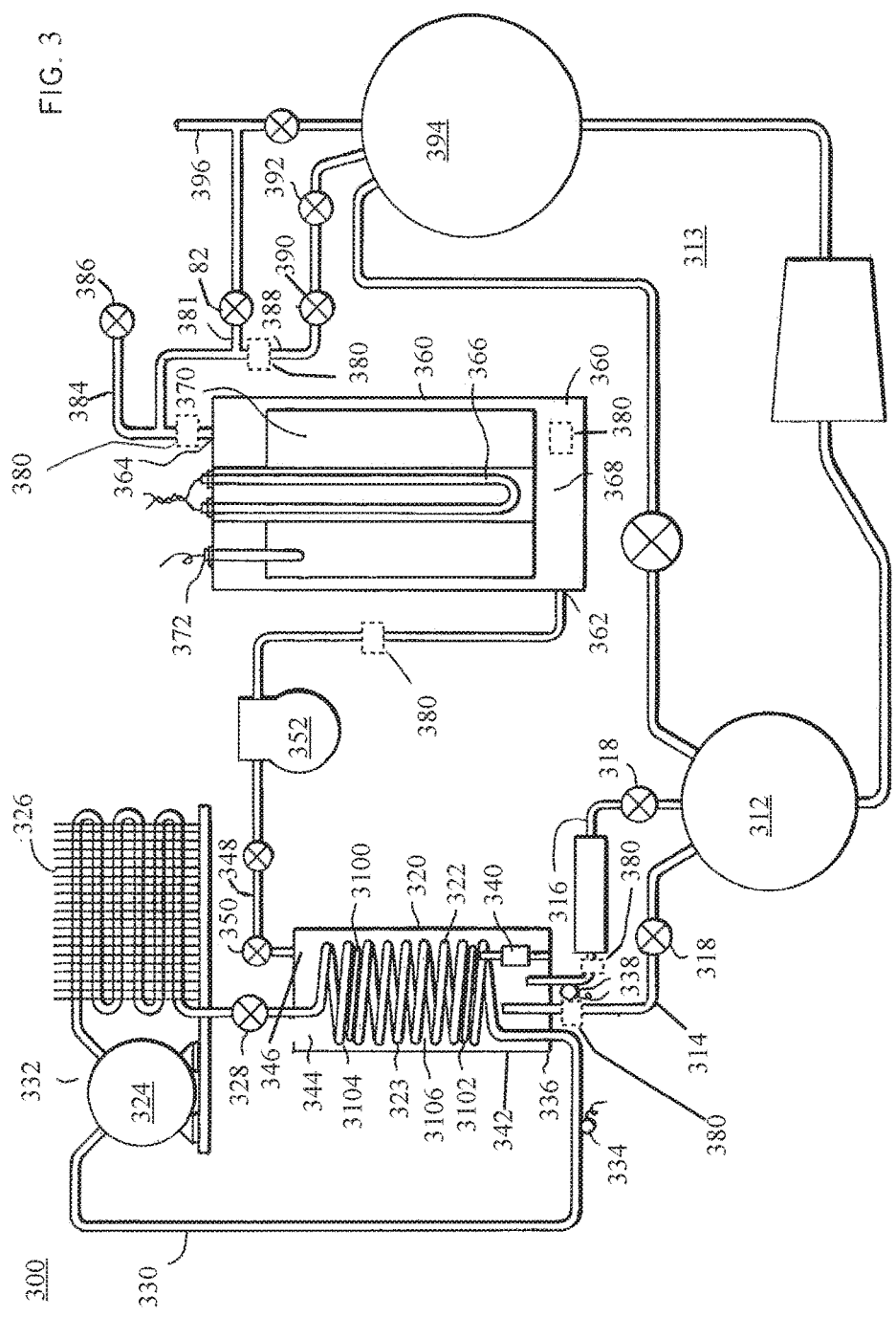
FIG. 3 illustrates a schematic drawing of an embodiment of a purge with a separation tank and an acid filter.

FIG. 3 illustrates a schematic drawing of a purge 300 with a separation device and one or more acid filters 380. The purge 300 is configured to remove non-condensables from the refrigerant of a refrigeration system, such as the chiller system 313. The purge 300 is different from the purge 200 in that the purge 300 further includes a separation device for separating non-condensable gases from condensable gases, which will be described further below. The acid filter 380 is configured to remove acid from the refrigerant. The acid filter 380 can be inside the purge 300. Optionally, the filter 380 can be located outside the purge 200. The acid filter 280 can be a component of the purge 300. Optionally, the acid filter 280 can be embedded into one or more components of the purge 300. Optionally, the acid filter 380 can be a separate unit.

The purge 300 is connected to a condenser 312 of the refrigeration system or the chiller system 313 by a supply line 314 and a return line 316. Isolation valves 318 are included in each of the supply and return lines 314, 316.

The purge 300 includes a separation device including a purge tank 320 to which the supply line 314 and the return line 316 connect. The purge tank 320 is a sealed tank enclosing a heat exchanger acting as an evaporator 322. The evaporator 322 may be implemented as a copper coil 323. The evaporator 322 can be a part of a second refrigeration system 332 including the evaporator 322, a compressor 324, a condenser 326 and an expansion device 328 all serially linked by a refrigeration tubing 330 into a refrigeration circuit to form the second refrigeration system 332.

In some embodiments, the second refrigeration system 332 can include a temperature sensor 334 located in the tubing 330 in proximity to an outlet 336 of the evaporator 322. A liquid temperature sensor 338 is provided in the return line 316 to measure the temperature of liquid refrigerant condensed by the evaporator 322 and being returned to the condenser 312. In some embodiments, temperature information may be obtained from a temperature sensor (not shown) in a sump of the condenser 312 when the chiller system 313 is on, and from an evaporator temperature sensor (not shown) when the chiller system 313 is off.

In the embodiment shown, the purge tank 320 includes a float switch 340 to measure and detect the accumulation of liquid refrigerant in a bottom area 342 of the purge tank 320. The float switch 340 inhibits operation if liquid accumulates.

The purge tank 320 also includes a header space 344 where non-condensable gases accumulate after the operation of the evaporator 322 condenses the condensable refrigerant gas into a liquid form. The non-condensable gases include, for example, air. The purge tank 320 includes a header outlet 346 and a header outlet line 348 to allow the non-condensable gases to be removed from the header space 344. A pump-out solenoid valve 350 is provided in the header line 348 to control the removal of the non-condensable gases. A pump-out compressor 352 is located in the header line 348 so as to provide a motivating force for the removal of the non-condensable gases from the header space 344.

The header line 348 leads to a separation tank 360 filled with a substance having an affinity for the condensable gases. In one embodiment, the separation tank 360 is filled with an activated carbon having an affinity for many system refrigerants including, for example CFC-11, CFC-113 and HCFC-123. The separation tank 360 includes an inlet 362, an outlet 364 and an electric heater 366 located within the separation tank 360. The separation tank 360 is filled with carbon 368 and a heat exchanger 370 is operatively connected between the heater 366 and the carbon 368 to enhance the heat exchange relationship therebetween. The pH of the carbon 368 can be neutral or low. The separation tank 360 also includes a temperature sensor 372 to measure the temperature within the separation tank 360 and control the operation of the electric heater 366. The outlet 364 of the separation tank 360 includes connections to an exhaust line 381 under the control of an exhaust valve 382, to a pressure relief line 384 under the control of a pressure relief device 386, and a second return line 388 under the control of a regeneration valve 390 and an isolation valve 392. The second return line 388 returns to an evaporator 394 of the chiller system 313. The exhaust line 381 is connected to a chiller vent line or an area of safe exhaust 396.

In some embodiments, the purge tank 320 can include baffles 3100 and 3102 respectively located in an upper area 3104 and a lower area 3106 of the purge tank 320. The baffles 3100, 3102 act to provide a controlled flow space for the condensable and non-condensable gases and a quiet zone in the header space where the non-condensable gases may accumulate. In operation, the baffles 3100, 3102 also serve to direct the gases into a condensing contact with the coil 323. The baffles 3100 and 3102 can be braised, welded or otherwise affixed to the copper coil 323 of the evaporator 322 within the purge tank 320.

In operation, the purge 300 is turned on and the purge evaporator 322 condenses the condensable refrigerant gas present in the purge tank 320, transforming or coalescing the condensable refrigerant gas into a liquid form which then returns through the return line 316 to the condenser 312 of the chiller system 313. The partial vacuum created within the purge tank 320 causes more condensable and non-condensable gases to enter through the supply line 314 to the purge tank 320 where the condensable gases continue to condense into liquid form and return to the chiller system 313. Eventually the header space 344 begins to fill with non-condensable gases and begins to affect the efficiency and operation of the purge evaporator 322 as measured by the temperature sensor 334 (or other detection means such as a pressure sensor or the like). At such time, a pump-out cycle may be initiated. In the pump-out cycle, the normally closed valve 350 and 382 are opened and the pump-out compressor 352 is turned on to cause the non-condensable gases to flow out the header line 348 into the separation tank 360. In the separation tank 360, condensable gases that may still be flowing with the non-condensable gases are attracted to the activated carbon 368 in the separation tank 360 and bond thereto, leaving the purified non-condensable gases to flow out the now open exhaust valve 382 to the vent area 396.

Periodically, the accumulated condensables with their affinity for the carbon 368 can be regenerated so that the carbon can be purified to improve its efficiency and so that the refrigerant condensables may be returned to the chiller system 313. This is accomplished by activating the electric heater 366 under the control of the temperature sensor 372. The addition of considerable heat and reduction of pressure to the carbon 368 in the separation tank 360 acts to break the affinity between the carbon 368 and the refrigerant gases. These gases are then drawn through the line 388 through the now open valve 390 and back to the chiller evaporator 394.

In one embodiment, the acid filter 380 can be located at the outlet 364 of the separation tank 360. The non-condensable gases and/or the regenerated refrigerant condensables from the separation tank 360 can be directed through the acid filter 380 to remove acid included therein.

The acid filter 380 can include a sacrificial material, for example, reactive metals such as aluminum or zinc metal(s), and/or other reactive metals or other reactive materials. The sacrificial material can be placed in the separation tank 360. The sacrificial material can last up to the lifetime of the purge. Optionally, additional sacrificial material can be added as needed which can be determined by a control algorithm method. A microprocessor that is operatively connected to the acid filter 380 can be used to execute the control algorithm method. The control algorithm method can also determine whether the acid filter 380 reaches its acid capacity and can be replaced after a pre-determined duration of regeneration time.

Optionally, the acid filter 380 can be embedded into the carbon 368 to remove acid from the non-condensable gases and the condensable gases flowing with the non-condensable gases. It will be appreciated that the acid filter 380 can be located at other positions downstream the separation tank 360, for example, the line 381 and/or the line 388. The filtered refrigerant gases are directed into the evaporator 394.

Optionally, the acid filter 380 can be located upstream the separation tank 360. For example, the acid filter 380 is connected to the pump-out compressor 352 to filter acid from the mixture of non-condensable and condensable gases directed from the purge tank 320 and the filtered gases are directed to the separation tank 360.

Optionally, the acid filter 380 can be located at the supply line 314 to remove acid from the chiller system refrigerant vapor which is drawn into the purge 300 from the vapor space in the condenser 312. The acid filter 380 can also be located at the return line 316 to remove acid from the condensed chiller refrigerant directed back from the purge tank 320.

Figure 4:
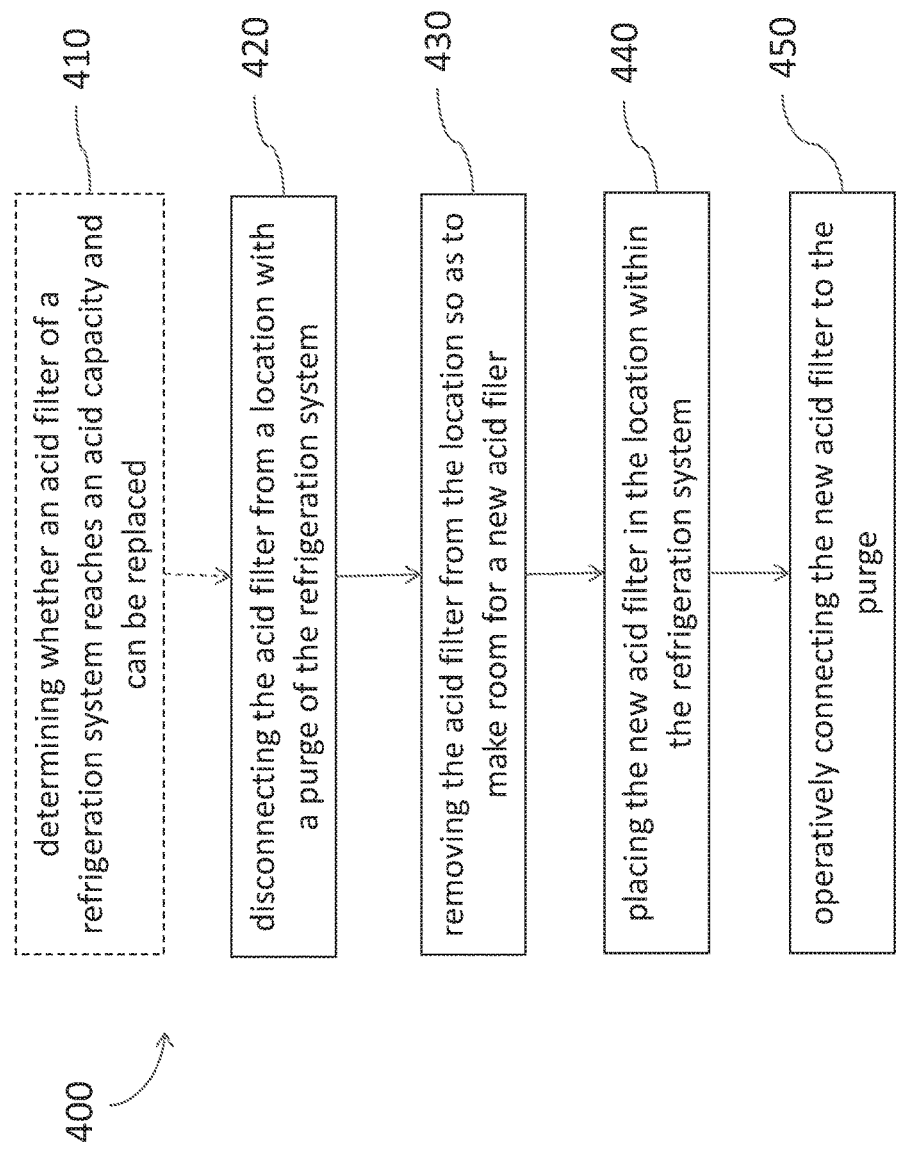
FIG. 4 illustrates an embodiment of a method for servicing an acid filter included in a refrigeration system.

FIG. 4 illustrates an embodiment of a method 400 for servicing an acid filter included in a refrigeration system. Optionally, at 410, a control algorithm determines whether an acid filter, such as the acid filter 130, 280 and 380, that is operatively connected to a purge, such as the purge 120, 200 and 300, reaches an acid capacity and can be replaced. In some embodiments, the control algorithm can be executed by a microprocessor that is operatively connected to the acid filter. The acid filter can be replaced at predetermined periods. In one embodiment, the control algorithm can estimate the amount of the refrigerant introduced to a separation tank, for example, the separation tank 360 filled with carbon, and/or the amount of the refrigerant rejected from a purge, such as the purge 200 or 300, and trigger a regeneration of the separation tank based on the estimation. After a pre-determined duration of regeneration time, the acid filter may reach its acid capacity and can be replaced. The method 400 then proceeds to 420.

At 420, the acid filter is disconnected from a location with a purge of the refrigeration system. The method 400 then proceeds to 430.

At 430, the acid filter is removed from the location so as to make room for a new acid filer. The method 400 then proceeds to 440.

At 440, a new acid filter is placed in the location within the refrigeration system to replace the old acid filter. The method 400 then proceeds to 450.

At 450, the new acid filter is operatively connected to the purge.

It is noted that any of aspects 1-17 below can be combined with any of aspects 18-20.

1. A refrigeration system, comprising:
   a compressor;
   a condenser;
   an expansion device;
   an evaporator;
   the compressor, the condenser, the expansion device, and the evaporator are fluidly connected to form a refrigeration circuit;
   a purge fluidly connected to the condenser to receive a chiller refrigerant flowing through the refrigeration system from the condenser, the purge configured to remove one or more non-condensable gases from the chiller refrigerant; and
   an acid filter operatively connected to the purge, the acid filter configured to remove one or more acids from the chiller refrigerant.
2. The refrigeration system of aspect 1, further comprising a separation device operatively connected to the purge at a downstream position of the purge, the separation device configured to receive a mixture from the purge and separate the non-condensable gases and the chiller refrigerant from the mixture.
3. The refrigeration system of aspects 1-2, wherein the acid filter is fluidly connected to an outlet of the separation device and configured to receive at least one of the non-condensable gases and the chiller refrigerant from the separation device and remove the acids from the chiller refrigerant and the non-condensable gases.
4. The refrigeration system of aspects 1-2, wherein the acid filter is fluidly connected to an inlet of the separation device.
5. The refrigeration system of aspect 1, wherein the acid filter is disposed within the purge.
6. The refrigeration system of aspects 1-2, wherein the acid filter is disposed within the separation device.
7. The refrigeration system of aspect 1, wherein the acid filter is located fluidly between the condenser and the purge.
8. The refrigeration system of aspects 1-7, wherein the purge and the condenser are fluidly connected via a supply line and a return line, and the acid filter is located on at least one of the supply line and the return line.
9. The refrigeration system of aspect 1, wherein the acid filter includes a sacrificial material configured to react with the acids.
10. The refrigeration system of aspects 1-9, wherein the sacrificial material includes one or more reactive metals.
11. The refrigeration system of aspects 1-10, wherein the reactive metals includes at least one of aluminum metal and zinc metal.
12. A system for removing undesired materials from a chiller refrigerant of a refrigeration system, comprising:
   a purge including an inlet to receive the chiller refrigerant from a condenser of the refrigeration system, the purge configured to remove one or more non-condensable gases from the chiller refrigerant, the purge further including an outlet to return the chiller refrigerant to the refrigeration system; and an acid filter fluidly connected to the purge and configured to remove one or more acids from the refrigerant.

13. The system of aspect 12, further comprising a separation device integrated with the purge, the separation device configured to receive a mixture from the purge and separate the non-condensable gases and the refrigerant from the mixture.

14. The system of aspects 12-13, wherein the acid filter is fluidly connected to an outlet of the separation device, configured to receive at least one of the non-condensable gases and the refrigerant and remove one or more acids from the non-condensable gases and the refrigerant.

15. The system of aspects 12-13, wherein the acid filter is fluidly connected to an inlet of the separation device.

16. The system of aspect 12, wherein the acid filter includes a sacrificial material configured to react with the acids.

17. The system of aspects 12-16, wherein the sacrificial material includes one or more reactive metals.

18. A method of removing undesired materials from a chiller refrigerant of a refrigeration system, comprising:
   receiving the chiller refrigerant from a condenser of the refrigeration system;
   removing one or more non-condensable gases from the chiller refrigerant; and
   removing one or more acids from the chiller refrigerant.

19. The method of aspect 18, wherein removing the acids from the chiller refrigerant includes reacting the acids with a sacrificial material, the sacrificial material includes one or more reactive metals.

20. A method of servicing an acid filter of a refrigeration system, comprising:
   disconnecting the acid filter from a location with a purge of the refrigeration system;
   removing the acid filter from the location so as to make room for a new acid filer;
   placing the new acid filter in the location within the refrigeration system; and
   operatively connecting the new acid filter to the purge.

21. The method of aspect 20, further comprising determining whether an acid filter reaches an acid capacity and can be replaced.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. A centrifugal chiller system, comprising:
   a compressor;
   a condenser;
   an expansion device;
   an evaporator;
   the compressor, the condenser, the expansion device, and the evaporator are fluidly connected to form a refrigeration circuit;
   a purge fluidly connected to the condenser to receive a chiller refrigerant flowing through the centrifugal chiller system from the condenser, the purge configured to remove one or more non-condensable gases from the chiller refrigerant, the chiller refrigerant being a low pressure refrigerant that operates at less than atmospheric pressure; and
   an acid filter operatively connected to the purge, the acid filter configured to remove one or more acids from the chiller refrigerant,
   wherein the acid filter is disposed within the purge, or is located fluidly between the condenser and the purge.

2. The centrifugal chiller system of claim 1, further comprising a separation device operatively connected to the purge at a downstream position of the purge,
   wherein the separation device is configured to receive a mixture from the purge, the mixture including one or more remaining non-condensable gases provided by the purge, and
   the separation device is configured to separate the one or more remaining non-condensable gases from the mixture.

3. The centrifugal chiller system of claim 2, further comprising an additional acid filter operatively connected to the purge,
   wherein the additional acid filter is fluidly connected to an outlet of the separation device and configured to receive from the separation device the one or more remaining non-condensable gases and remove one or more acids from the one or more remaining non-condensable gases.

4. The centrifugal chiller system of claim 2, wherein the acid filter is fluidly connected to an inlet of the separation device.

5. The centrifugal chiller system of claim 1, wherein the purge and the condenser are fluidly connected via a supply line and a return line, and the acid filter is located on at least one of the supply line and the return line.

6. The centrifugal chiller system of claim 1, wherein the acid filter includes a sacrificial material configured to react with the acids.

7. The centrifugal chiller system of claim 6, wherein the sacrificial material includes one or more reactive metals.

8. The centrifugal chiller system of claim 7, wherein the one or more reactive metals includes at least one of aluminum metal and zinc metal.

9. The centrifugal chiller system of claim 1, wherein the acid filter includes an ionic salt configured to react with the acids.

* * * * *